April 29, 1958  D. GIACOSA  2,832,133
METHOD OF MANUFACTURING POLE PIECES FOR
ELECTRICAL MACHINERY
Filed March 4, 1954
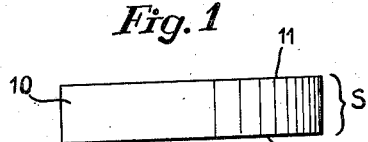
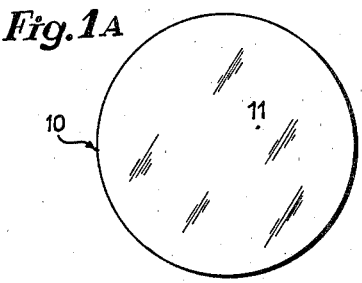
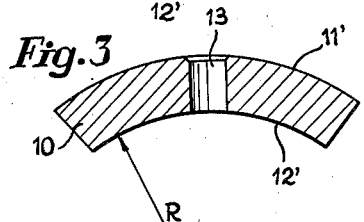
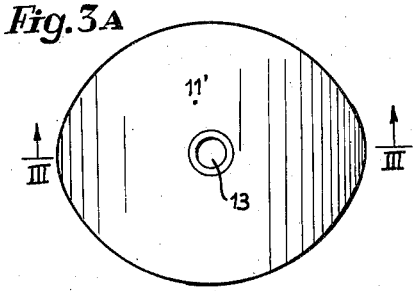
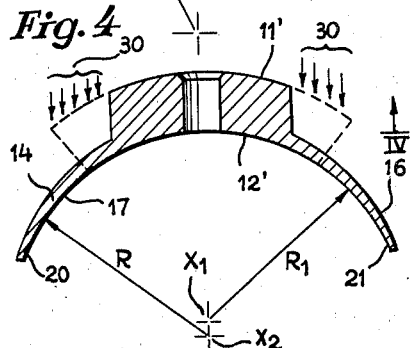
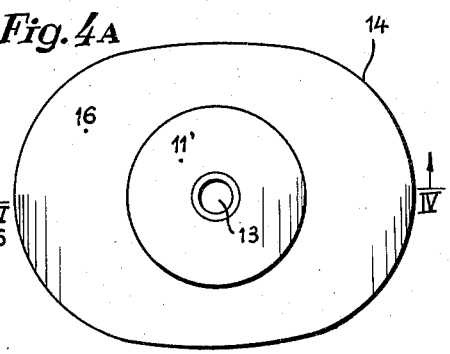
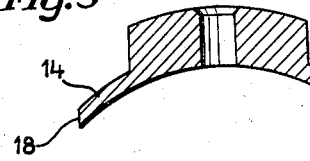
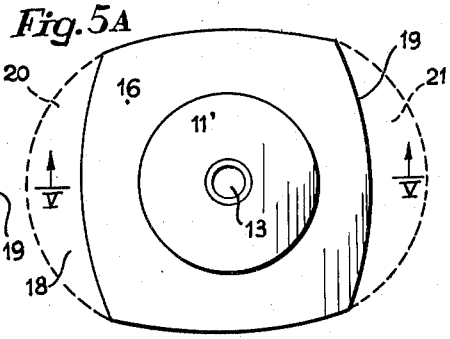

United States Patent Office 2,832,133
Patented Apr. 29, 1958

2,832,133
METHOD OF MANUFACTURING POLE PIECES FOR ELECTRICAL MACHINERY

Dante Giacosa, Turin, Italy, assignor to Fiat Società per Azioni, Turin, Italy

Application March 4, 1954, Serial No. 414,113

Claims priority, application Italy August 18, 1953

2 Claims. (Cl. 29—556)

This invention relates to the manufacturing of curved flanged members having a cylindrical body portion and a curved flange extending over the periphery of one end of said body portion, such as rivets for special nailed connections, bearings for rotating shafts, more particularly pole pieces for dynamo-electric machines. The invention shall be described hereinafter with reference to pole pieces, but it is understood that all the details of my invention can be easily applied to the manufacture of similar articles without departing from the scope thereof as defined by the appended claims.

A first object of this invention is to provide a method for manufacturing bodies of the type referred to above, which is simpler and less expensive than methods known heretofore.

A second object of this invention is to provide a method of manufacturing bodies of the type referred to above by plastic deformation eliminating waste in the form of cuttings or chips.

A further object of this invention is to provide a method for manufacturing bodies of the type referred to above, adapted to decrease manufacturing time and increase production.

A further object of this invention is to provide a novel method of manufacturing pole pieces for dynamo-electric machines in which a blank is transformed into the finished article by a minimum number of manufacturing steps or operations with no or only negligible waste of material.

My improved method of manufacturing a curved flanged article comprises the steps of cutting from cylindrical metal stock a blank of circular disc shape; bending said disc to arcuated form without appreciably reducing its initial thickness and so as to obtain a concave and convex surface, respectively, on the opposite disc faces; and compressing the peripheral portion of said blank in the direction of the convex face towards the concave face, to obtain at the concave face a flange extending throughout a cylindrical central core.

According to a further embodiment, the method of manufacturing a pole for dynamo-electric machines consists in cutting from cylindrical ferro-magnetic stock a blank of circular disc shape; bending said disc to arcuated shape to form a convex and concave face, respectively, said faces being substantially parallel with each other; boring said disc substantially at the centre thereof; and compressing the peripheral blank portion in the direction from the convex face towards the concave face in order to obtain a cylindrical core ending by a curved flange, having a concave face forming the extension of the concave core face and a convex face of the same curvature as said concave face.

Further characteristic features and advantages of the method according to this invention will be understood from the following description referring to the enclosed diagrammatic drawing which shows the successive steps of manufacture. On the drawing:

Figure 1 is a side view of the disc cut from cylindrical stock;

Figure 1A is a plan view of Figure 1;
Figure 2 is a side view of the curved blank;
Figure 3 is a section on line III—III of Figure 3A after boring the blank;
Figure 3A is a plan view of the blank shown in Figure 3;
Figure 4 is a section on line IV—IV of Figure 4A of the blank provided with the flange;
Figure 4A is a plan view of the blank shown in Figure 4;
Figure 5 is a sectional view of the blank after the last manufacturing step, and taken on line V—V of Figure 5A, and
Figure 5A is a plan view of the blank shown in Figure 5.

The method according to this invention starts from a cylindrical metal stock, more particularly ferro-magnetic stock when it is desired to manufacture pole pieces for dynamo-electric machines as in the example to be described with reference to the figures. The cylindrical bar is fed to a truncating machine, such as a machine equipped with a saw or grinding wheel; however, a machine operating by plastic deformation is preferred. Blanks are cut from said bar, each blank being of circular disc shape as at 10, with two parallel plane faces 11 and 12, the disc thickness being denoted by "S." This cutting operation as well as all the further operations are preferably carried out in a cold state, consistently with the character of the material. It is also possible to work the material while heated, more particularly when the blank is subjected between successive steps to heat treatment for eliminating any internal stresses due to the preceding steps.

The disc-shaped blank 10 is successively brought into a press between two dies (not shown on the drawing and curved to form a convex face 11' and a concave face 12', the two faces being opposite to and substantially parallel with each other. The shape of the moulds is such that the blank is bent without any appreciable alteration of its initial thickness S.

By the next step the curved blank is bored substantially at its center by means of a punch which on movement for instance in the direction from the convex face 11' towards the concave face 12' bores in the blank a hole 13 which serves for the successive attachment of the finished pole to the stator shell of a dynamo-electric machine, for instance by means of a screw. With this object in view the hole 13 may be tapped subsequent to last step of my improved manufacturing process.

In Figure 3, R denotes the radius of curvature of the concave face 12' of the blank. It will be obvious that the convex face 11', since it is parallel with the concave face, is of a radius of curvature greater than R in accordance with the thickness S of the blank and equalling the inner radius of the shell to which the finished pole piece shall be attached.

The curved bored blank, as shown in Figures 3 and 3A, is transferred to a further press and fitted by its concave face 12' against a mold of the same curvature R; a die is applied against the convex face 11' which is adapted to compress the peripheral blank portion, as indicated by the arrows 30 in Figure 4, so as to produce a flow of material in a direction from the convex towards the concave face. The material displaced as just explained flows towards the lower portion of the drawing providing a cylindrical central core and forming at the concave face 12' a flange 14 extending all round the core. In order to obtain pole pieces meeting every requirement from the standpoint of the distribution of the magnetic field in the dynamo-electric machine, it is advantageous to shape the dies for carrying out the last described step so as to obtain a flange 14 growing thinner towards its end portions indicated by 20 and 21 in Figure 4. In order to obtain this effect in a simpler manner, without expensive preparation of the dies, it will be sufficient for the latter to have cylindrical surfaces of the same curvature, but with suitably displaced centres of curvature.

This forms on the flange 14 a concave face 17, having a radius of curvature R and forming an extension of the concave face 12' of the blank, and a convex face 16, of which the radius of curvature $R_1$ equals the radius R. Taper of the flange towards the portions 20 and 21 is then simply due to the fact that the axes X1 and X2 of the two cylindrical surfaces 16, 17, respectively are displaced to each other in the manner indicated in Figure 4. These axes X1 and X2 are perpendicular to the plane of the drawing defining the plane of curvature of the blank, that is, the plane on which the radii of curvature R, R1 are situated.

As a result of the taper of the flange 14 from the center of the blank towards its end portions 20, 21, the said flange takes an elongated approximately elliptic form, as is clearly shown by Figure 4A.

The last step of the process which in certain cases may even be neglected, tends to suit the peripheral profile of the flange 14 to particular requirements, such as might be essential in the case of a pole piece. In this step the flange 14 is cut along two lines 18, 19, respectively, so as to eliminate the opposite portions of the flange indicated by 20 and 21 in Figure 5A. These lines 18, 19 are substantially perpendicular to the plane of the drawing, that is, to the plane of curvature of the blank, and preferably slightly curved, as clearly indicated in said figure. The cut away portions 20, 21 are actually the only waste in manufacture.

The flange forming step may be advantageously preceded by a surface treatment of the blank, such as phosphatising in order to improve flow of the metal between the dies. This and further generally known auxiliary treatments may be carried out without departing from the scope of this invention.

It will be obvious that the method according to this invention enables simple and inexpensive manufacture of poles of a highly advantageous shape. In fact, a pole with a cylindrical core affords a more favorable use of magnetomotive forces, the length of the average turn of the cylindrical spool surrounding the core being, the polar section of the core being the same, shorter than the mean turn length obtained by a core of any other form. This improves the characteristic features of the dynamo having poles manufactured by this improved method.

On the other hand, this method jointly with the cylindrical pole shape affords a considerable economy in cost of manufacture not only of the pole pieces, but also of the complete dynamo. Since the core is of cylindrical section, extremely high winding speeds can be adopted. Moreover, the regular shape of the turns affords a more efficient use of the space, hence an economy in copper wire. Moreover, the starting material is inexpensive as it is in the form of ordinary cylindrical stock. Finally, my improved method eliminates approximately all waste and does away with expensive cutting tools, such as milling cutters requiring much maintenance, and pole pieces having an edge of any desired profile may be manufactured, for instance for obtaining a more gradual variation in flux from one slot to another of the armature on rotation of the latter, thereby attenuating the noise level of magnetic whistle.

It will be clear that the invention fulfils all the objects enumerated above produced as the armature rotates.

It is understood that the process is not limited to the field described and details thereof can be varied without departing from the scope of the appended claims.

What I claim is:

1. A method of manufacturing pole pieces for electrical machinery comprising the steps of providing substantially cylindrical ferromagnetic stock having grain orientation in the longitudinal direction of the stock, cutting a substantially circular blank from said stock, the blank having a selected thickness corresponding substantially to the axial length of a finished pole piece, bending the blank in a direction for rendering the blank arcuate in configuration with cylindrically concave and cylindrically convex opposite faces having selected concentric radii and substantially uniform surfaces, the bending being made without appreciably reducing the thickness of the blank, applying squeezing pressure on only a substantially annular, peripheral portion of the arcuate-shaped blank in a direction toward the concave face to reduce the thickness of said peripheral portion to less than half of the thickness of the blank while maintaining the radius of the concave face constant, and simultaneously controlling the flow of metal from the convex face toward the concave face and radially outwardly of the blank to form an arcuate flange portion extending radially of a cylindrical core portion of said blank and having a cylindrically concave surface with a radius substantially corresponding to the selected radius of the concave face of the arcuate blank and with the grains oriented radially of said core portion, thereby to form a pole piece with a substantially cylindrical core portion having an axial length corresponding to the thickness of said blank with the grains oriented axially thereof and said flange portion extending radially of said core portion with the grains oriented radially of the core portion and blending with said axially extending grains to provide a flux path of low reluctance.

2. A method according to claim 1, including the step of cutting off two opposed peripheral portions of equal size from said flange portion.

References Cited in the file of this patent

UNITED STATES PATENTS

| | | |
|---|---|---|
| 141,125 | Dueber | July 22, 1873 |
| 965,041 | Slick | July 19, 1910 |
| 1,050,121 | Frommer | Jan. 14, 1913 |
| 1,486,365 | Cummings | Mar. 11, 1924 |
| 1,494,824 | Taylor | May 20, 1924 |
| 2,384,145 | Voity | Sept. 4, 1945 |
| 2,513,149 | Coutant | June 27, 1950 |